(12) United States Patent
Scerbina

(10) Patent No.: US 8,226,348 B2
(45) Date of Patent: Jul. 24, 2012

(54) VERTICAL AXIS ROTOR-TYPE WIND TURBINE

(75) Inventor: Aleksandrs Scerbina, Riga (LV)

(73) Assignee: AS Atakama Eolika, Talsi (LV)

( * ) Notice: Subject to any disclaimer, the term of this patent is extended or adjusted under 35 U.S.C. 154(b) by 668 days.

(21) Appl. No.: 12/366,370

(22) Filed: Feb. 5, 2009

(65) Prior Publication Data

US 2009/0202356 A1 Aug. 13, 2009

(30) Foreign Application Priority Data

Feb. 5, 2008 (CL) .................................. 0359/2008

(51) Int. Cl.
*F03D 3/06* (2006.01)
(52) U.S. Cl. ........... 415/4.2; 415/4.4; 415/907; 416/111
(58) Field of Classification Search ................... 415/4.2, 415/4.4, 907; 416/111, 196 A, 227 R; 290/44, 290/55
See application file for complete search history.

(56) References Cited

U.S. PATENT DOCUMENTS
2003/0235498 A1* 12/2003 Boatner ....................... 416/119

FOREIGN PATENT DOCUMENTS
GB 2 386 925 A 10/2003
WO WO 02053908 A1 * 7/2002
* cited by examiner

*Primary Examiner* — Thanh Nguyen
(74) *Attorney, Agent, or Firm* — Seed IP Law Group PLLC

(57) ABSTRACT

The invention refers to the field of wind power engineering, particularly to the vertical axis rotor-type wind turbines, which can be used for drive of electric generators or other using equipment of mechanical energy. The rotor-type wind turbine contains a central vertical shaft, mounted in a hollow elongated supporting column, and rotor structure, comprising two lattice-type blocks with power elements—the lattice-type stacks of aerodynamic blades. Each of the lattice-type blocks is carried by two corresponding lattice-type arms. When using the wind turbine two-block structure, the blocks are positioned by 180° to each other. The end parts of the aerodynamic lattice-type blades in blade blocks are fastened in relevant upper and lower shroud flanges. Each blade block forms the lattice and inter-blade channels so that the efficiency of utilization of the energy of the wind blowing along the inter-blade channels is determined as the sum of thermodynamic component and kinetic component of the factor of utilization kinetic energy of wind. Moreover, the design of vertical-axis wind turbine provided with lattice-type blade blocks and inter-blade channels ensure the rotation of the rotor under the impact of air flux even at low wind velocities.

11 Claims, 3 Drawing Sheets

VERTICAL AXIS ROTOR-TYPE WIND TURBINE

BACKGROUND

1. Technical Field

The invention refers to the field of wind power engineering, particularly to the vertical axis rotor-type wind turbines, which can be used for drive of electric generators or other using equipment of mechanical energy.

2. Description of the Related Art

Propeller-type wind turbines with a rated power of 100 kW or more are well known and widely used, for instance, from the description of UK Patent Application No. 2386925 of Jan. 10, 2003, SKI[7] F03D11/04, 11/02, which contains three blades, mounted on horizontal axis low-speed shaft for transmitting drive from wind-driven blades through a bevel gear to the generator located within the housing. The power is produced under the influence of friction. A common disadvantage of the known propeller-type wind generators is low efficiency of wind power, which for such generators usually does not exceed 0.45 to 0.48.

Vertical axis rotor-type wind turbines of prior art are also known, which is regarded as being the closest prior art to the subject matter for wind turbine with respect to its technical solution and the attained result is a latticed-type wind turbine, for example, from the description of International Patent Application No. WO 02/053908 of Jul. 11, 2002, SKI[7] F03D11/00; F03D3/06; F03D3/00, which contains a rotor structure with power elements and the supporting arms thereof mounted on the vertical rotor shaft. The power elements are fabricated as subsonic aerodynamic turbine blades and form block means of the aerodynamic blades spaced at the equal angles around its periphery of the said rotor. At that the wind turbine is mainly provided with 2 to 3 aerodynamic lattice blocks with 3 to 4 motionlessly fixed aerodynamic turbine blades arranged in cascade near the periphery of each block. The cascade of the blades is arranged so that the blades in the cascade of the respective block are displaced in the rotary direction on the left or on the right of radius lines of lattice blocks and shifted with respect to these radius lines by the half of blade's chord, but the dimensions of the said chords forming the cascade have the values selected on dependence of value of aerodynamic shading coefficient that is not greater than 0.6. The efficiency of operation of the prior art rotor-type wind turbines depends upon a selected lead of blade, the mounting angle of the lattice block, as well as upon the displacement of the lattice blades, the value of shading factor, the angle of lateral bending of blade profiles and the dimensions of the chords. The lattice-type rotor wind turbines of prior art do not provide sufficient efficiency of utilization of wind power.

BRIEF SUMMARY

An object of present invention is to increase the efficiency of utilization of wind power, to provide simplification of design of the wind turbine and to improve their operation properties.

The object of the invention is attained by that a vertical axis rotor-type wind turbine is provided with a rotor structure with power elements fabricated as subsonic aerodynamic turbine blades forming 2 to 3 aerodynamic blocks with 3 to 4 motionlessly fixed aerodynamic blades in each block and the supporting arms thereof mounted on the vertical rotor shaft and spaced circumferentially at the equal angles round the vertical axis of the rotor, the blocks of blades are mounted on the respective arms near the periphery of rotor and displaced in the rotary direction on the left or on the right of radius lines of blocks by the determined blade deflection value. According to the invention the end parts of every blade block are fastened in shroud flanges forming the blade lattice and inter-blade channels so that the wind blowing along the lattice and the inter-blade channels generates thermodynamic processes resulted from enthalpy by the occurrence of thermodynamic processes causing changes in the air flux pressure and thermodynamic temperature in such way that the blades are impacted by the thermodynamic energy of the air flux additionally to the kinetic energy. At that the power, developed by the blade blocks and transferred to the rotor shaft of the wind turbine during one revolution of the rotor, depends upon the below equality:

$$N_P = G_{BP}[Cp(T_1-T_2)+(V_B^2-C_2^2):2](W),$$

where $N_P$ is the power transferred to the rotor shaft of the wind turbine;

$G_{BP}$—the mass of airflow rate, kg/sec.;

$Cp=1004.85$ (J/kg K)—isobar heat capacity of air;

$T_1$ and $T_2$—correspondingly, the thermodynamic temperature before and beyond of the blade lattice in K (Kelvin), ° K;

$V_B$—wind velocity, m/sec;

$C_2$—absolute air velocity beyond the blade lattice, m/sec.

But, the parameters of the wind turbine blade lattices as defined above and the design of the rotor elements are selected so that the efficiency of utilization of the energy of the wind blowing along the working blade stack is determined as the sum of thermodynamic component $\eta_{td}$ of the factor of utilization kinetic energy and kinetic component $\eta_{kin}$ of the factor of utilization of kinetic energy of wind, depends upon the below equality:

$$\eta_L = \eta_{td} + \eta_{kin} = 2Cp/V_B^2(T_1-T_2)+(1-C_2^2/V_B^2),$$

where $\eta_L$ is the overall factor of utilization of wind energy;

$\eta_{td}$—is the thermodynamic component of the factor of utilization of wind kinetic energy;

$\eta_{kin}$—is the kinetic component of the factor of utilization of wind kinetic energy;

$Cp=1004.85$ (J/kg K)—isobar heat capacity of air;

$T_1$ an $T_2$—correspondingly, the thermodynamic temperature before and beyond of the blade lattice in K (Kelvin), ° K;

$V_B$—the wind velocity, m/sec;

$C_2$—the absolute air velocity beyond the blade lattice, m/sec.

Moreover, the parameters of the wind turbine blade lattices and the rotor structure elements are selected so that the self-starting of the rotor occurs at the wind velocity of about 2 m/sec.

BRIEF DESCRIPTION OF THE SEVERAL VIEWS OF THE DRAWINGS

The invention may be better understood from the following detailed description of an embodiment thereof due reference being made to the accompanying drawings, in which.

DETAILED DESCRIPTION

Figure 1:
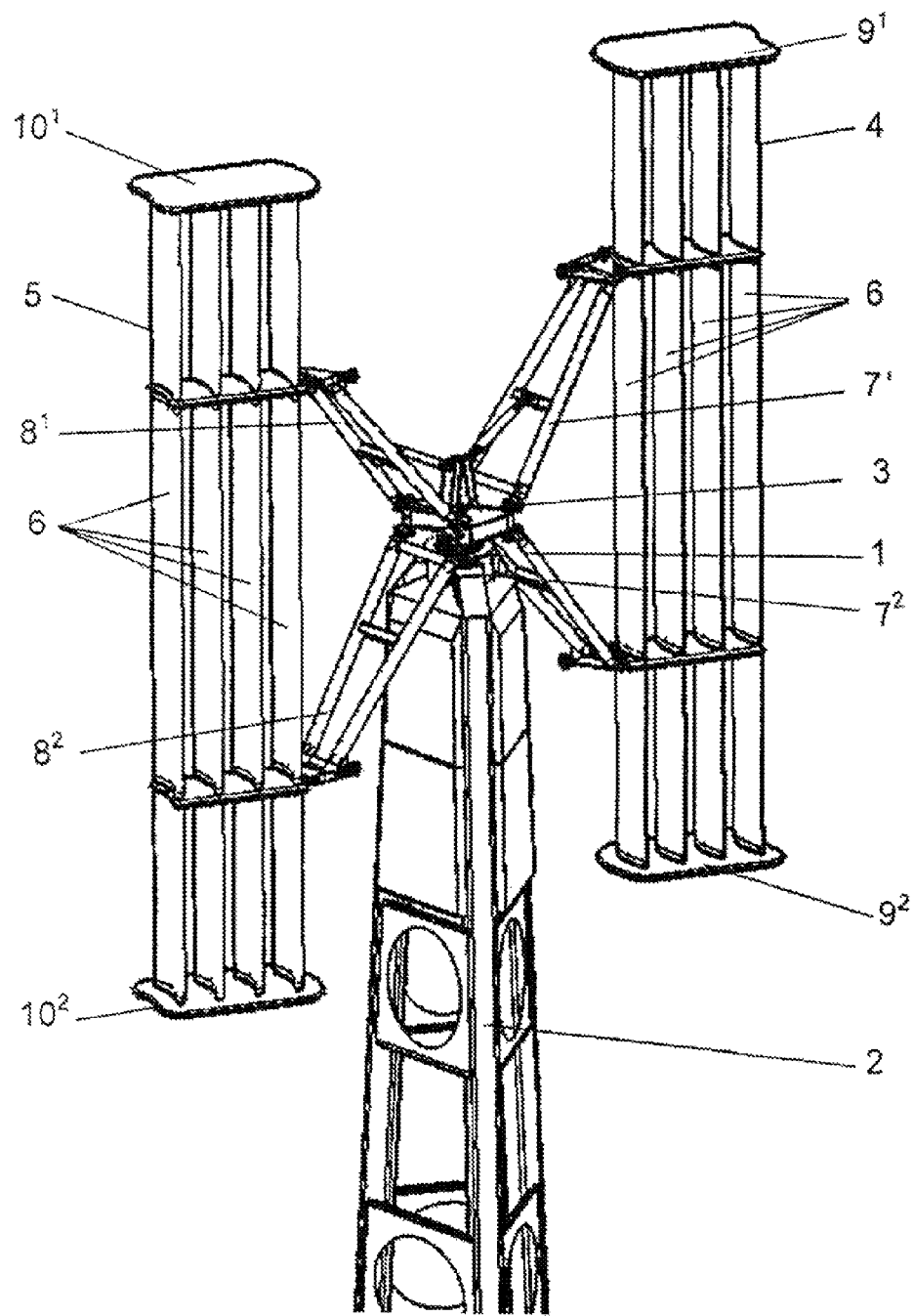
FIG. 1 shows the vertical axis rotor-type wind turbine in the axonometric view.
Figure 2:
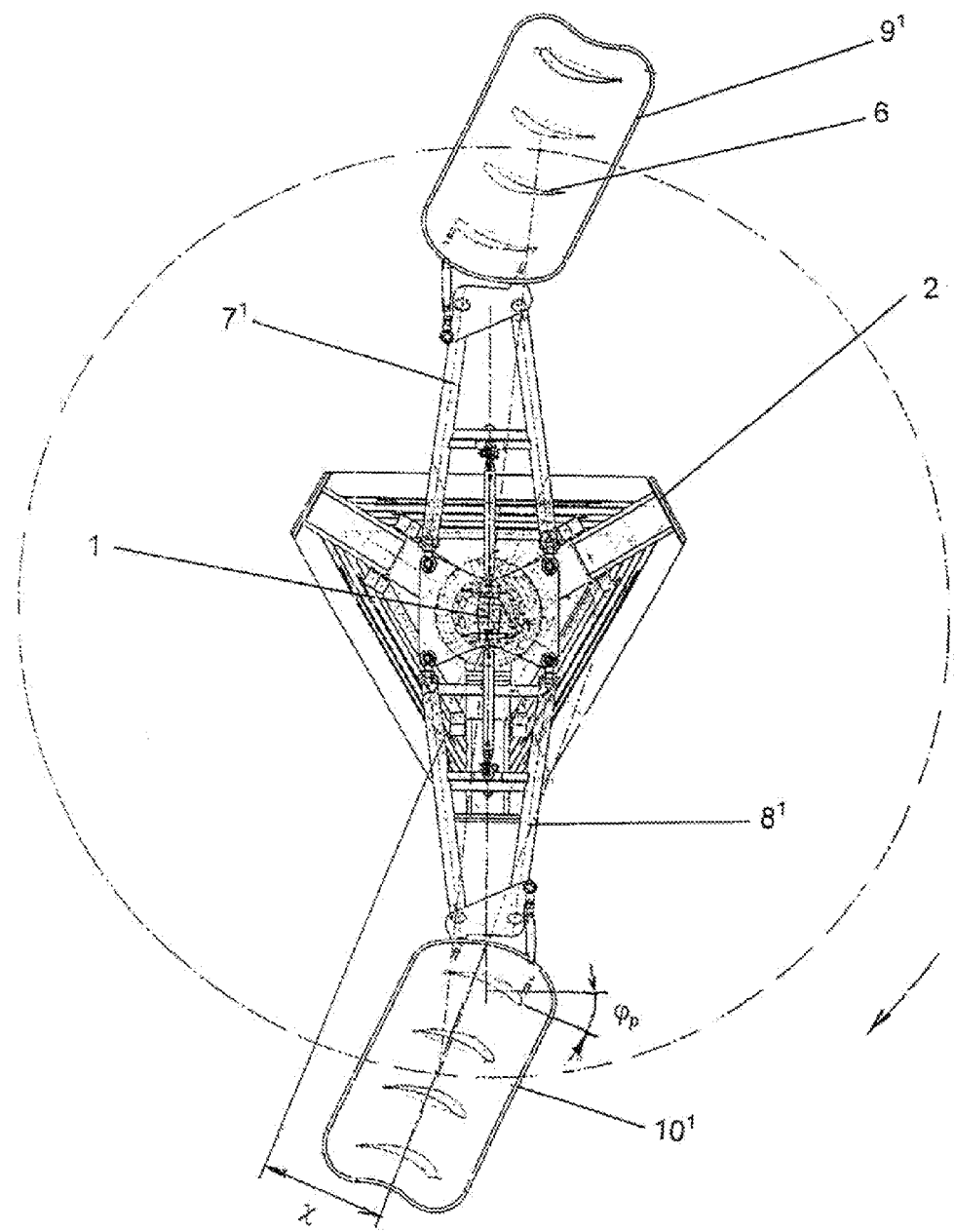
FIG. 2 is a schematic top view of wind turbine.
Figure 3:
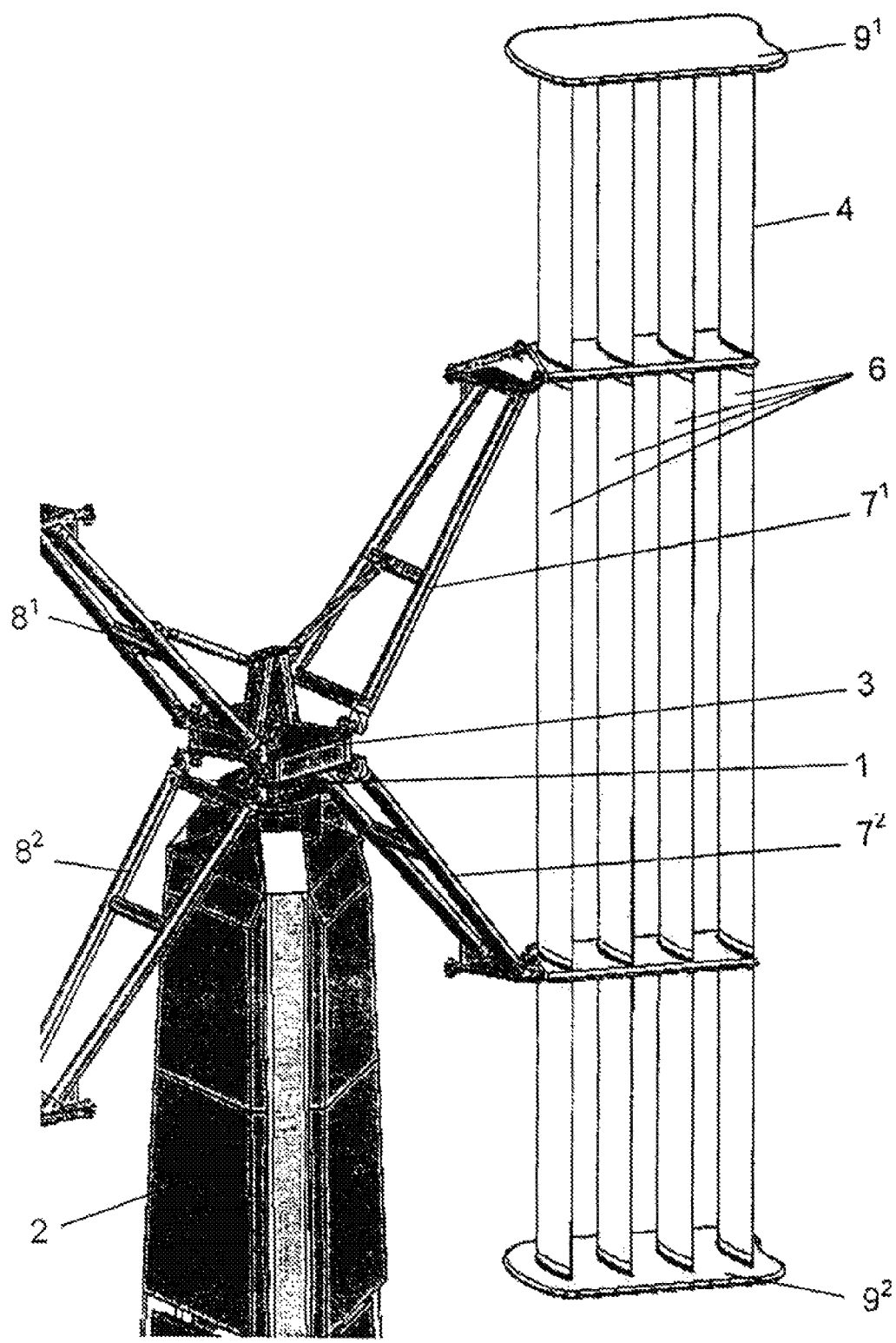
FIG. 3 is a schematic view of the wind turbine lattice-type blade blocks in the axonometric projection.

The rotor-type wind turbine contains a central vertical shaft 1 (FIG. 1), which is mounted in a hollow elongated supporting column 2 and contains rotor structure 3, comprising two lattice-type blocks 4 and 5 with power elements—the stacks of aerodynamic blades 6. Each of the lattice-type blocks 4 and 5 is carried by two corresponding lattice-type arms $7^1$, $7^2$ and $8^1$, $8^2$. When using the wind turbine two-block structure, the blocks 4, 5 are positioned by 180° to each other, but at the three-block structure the blocks are shifted by 120° against each other around the circumference of the rotor. In each lattice-type block 4 and 5 there are motionlessly fastened four aerodynamic blades 6 in stack at the determined distance— lead of blade—one from another partially shading each of them characterized by the shading factor ($K_3$). Each lattice-type block 4 and 5 is displaced from the corresponding radius symmetry line by the selected blade deflection value ($\chi$). The profiles of the stack of blades 6 are positioned in a turbine-type composition so that the values of the mounting angle ($\phi_p$) of the blocks 4 and 5 are proximal to zero (FIGS. 2 and 3). Each lattice-type block 4, 5 is equipped with relevant upper $9^1$, $10^1$, and lower shroud flanges $9^2$, $10^2$, wherein the relevant end parts of the aerodynamic blades 6 are fastened. Each blade block 4, 5 forms the lattice and inter-blade channels so that the efficiency of utilization of the energy of the wind blowing along the inter-blade channels is determined as the sum of thermodynamic component and kinetic component of the factor of utilization kinetic energy of wind. Moreover, the structure of vertical-axis wind turbine provided with lattice-type blades and inter-blade channels ensure the rotation of the rotor under the impact of air flux at low wind velocities. The wind turbine is equipped with a mechanic brake (not shown). It is applied to shut down and to lock the rotor 3 during high winds. The speed-up gearing and generator (not shown) of wind turbine with which the vertical shaft 1 is linked, may be positioned on the ground level.

The wind turbine's self-start, i.e., the running of the rotor 3 starts at wind velocity of about 2 m/sec, using no external drive. When the operation of the equipment is started, under the influence of the wind, the conditions of air flow by the wind flux of the rotor 3 with a vertical axis of rotation remain always the same with all the possible wind directions, resulting in that no mechanism or device is needed for the orientation of the working elements of the rotor 3 in relation to the wind direction. Using as power elements the rotating lattice-type blades 6, a deeper expansion of thermodynamic air process are provided in the inter-blade channels of the blade stacks. It means that while air is blowing through the inter-blade channels of blades 6, the air pressure might decrease. At the character of air flux with an decrease in the relative velocity of the air flux flowing through the blade lattice or channels the expansion thermodynamic process always takes place. Together with the change of pressure also the Kelvin temperature of the air flux changes, during the expansion thermodynamic process the Kelvin temperature reduces. The full available energy of air flux is equal to the enthalpy of retardation and represents the sum of the air enthalpy in the flux and the kinetic energy of that flux.

As follows from the described processes the work produced by the air flux and transferred from the rotor shaft is executed not only due to the kinetic energy, but also due to the thermodynamic energy generated of air expansion when blowing along the blade lattice.

The power generated by the stack of blades 6 and transferred to the wind turbine rotor shaft 1 during one rotation depends upon below equality:

$$N_P = G_{BP}[Cp(T_1-T_2)+(V_B^2-C_2^2):2](W),$$

where $N_P$ is the power on wind turbine rotor shaft;
$G_{BP}$—the mass of airflow rate, kg/sec.;
Cp=1004.85 (J/kg K)—isobar heat capacity of air,
$T_1$ and $T_2$—accordingly the Kelvin temperature before and beyond of the blade lattice, ° K;
$V_B$—the wind velocity, m/sec;
$C_2$—the absolute air velocity beyond the blade lattice, m/sec.

In general, the efficiency of utilization of kinetic wind energy blowing along the blade stack is determined as the sum of thermodynamic factor $\eta_{td}$ of the wind kinetic energy and kinetic factor $\eta_{kin}$ of the wind kinetic energy:

$$\eta_L = \eta_{td} + \eta_{kin} t.i. = 2Cp/V_B^2(T_1-T_2)+(1-C_2^2/V_B^2)$$

For better understanding, let us explain by an example, when the wind velocity is 10 m/sec, i.e., $V_B$=10 m/sec; the absolute air velocity beyond of the blade lattice will be:

$C_2$=7 m/sec and very weak process of the expansion of air in the blade lattice, producing a very insignificant reduction in the thermodynamic temperature:

$T_1-T_2$=0.02° K. Then the efficiency will be:

$$\eta_L = 2\times 1004.85/10^2 \times 0.02 + (1-7^2/10^2) = 0.40194 + 0.51 = 0.91194$$

The above example shows that even a very weak process of air expansion in the blade lattice leads to a very high energy efficiency of described lattice-type wind turbine. From the point of view of the mechanical action, the power of the rotor depends not only on the gas dynamic, but also on the hydrostatic impact on the working blades of the wind turbine rotor. The hydrostatic impact generates extra forces acting on the lattice in a similar way as a sail surrounded by the air flow.

The vertical axis rotor-type wind turbine can be characterized by the following advantages:
- relative simplicity of production and installation on the location of exploitation and servicing, since the step-up gear and generator may be situated on the ground level;
- absence of mechanisms and devices for the orientation of the working elements of the rotor in relation to the wind direction;
- noise level during operation of the wind turbine is very low and it does not generate oscillations in the air in the frequency range that is harmful to health; the distance of the noise propagation of the working wind turbine does not exceed 20-25 m;
- when the operation of the equipment is started the rotor under the influence of the wind, the rotor is driven up to speed independently, without the use of an additional external drive;
- the process of production of the working blades of the rotor is characterized by technological simplicity;
- it is characterized by the high energy efficiency, evaluated using the factor of utilization of kinetic energy of the incoming wind flux;
- it is also characterized by the reduced loss of energy thanks to providing of the end parts of blade stacks with the shroud flanges forming the blade lattice and thus preventing any air overflow through the end parts of the blades and equalization of pressure impacting on the opposite walls of blades, in this way actually eliminating all main reasons that cause the energy loss at the end parts of the blades;
- the shroud flanges that fasten together the end parts of blades improve not only the aerodynamic properties, but also eliminate free vibration of the end parts of blades and improve the properties of reliability of the blade stacks of wind turbine.

The described vertical axis rotor-type wind turbine is industrially applicable for the conversion of the wind energy into the electric energy.

The invention claimed is:

1. A vertical axis rotor-type wind turbine, comprising:
a rotor shaft that extends along a vertical axis of the wind turbine; and
a rotor structure including
at least two aerodynamic blocks of blades, each respective block of blades including a plurality of subsonic aerodynamic blades motionlessly fixed to and extending vertically between an upper shroud flange and a lower shroud flange, each upper shroud flange being separate and distinct from each other upper shroud flange and each lower shroud flange being separate and distinct from each other lower shroud flange, and
a plurality of pairs of supporting arms mounted on the rotor shaft and spaced circumferentially at equal angles around the vertical axis of the wind turbine, wherein each respective one of the blocks of blades is mounted on a respective pair of supporting arms near a periphery of the rotor and is laterally displaced with respect to a line that extends radially from the vertical axis of the wind turbine by a selected blade deflection value.

2. A vertical axis rotor-type wind turbine according to claim 1, wherein the power generated by the stack of blades and transferred to the wind turbine rotor shaft during one rotation depends upon the below equality:

$$N_P = G_{BP}[Cp(T_1-T_2)+(V_B^2-C_2^2):2](W),$$

where $N_P$ is the power on wind turbine rotor shaft;
$G_{BP}$—the mass of airflow rate, kg/sec;
$Cp=1004.85$ (J/kg K)—isobar heat capacity of air;
$T_1$ and $T_2$ respectively, the Kelvin temperature before and beyond of the blade lattice, ° K;
$V_B$—the wind velocity, m/sec;
$C_2$—the absolute air velocity beyond the blade lattice, m/sec.

3. A vertical axis rotor-type wind turbine according to claim 1, wherein the blocks of blades are configured so that efficiency of utilization of energy of wind blowing along a respective one of the blocks of blades is determined as a sum of a thermodynamic component of a factor of utilization of kinetic energy and a kinetic component of the factor of utilization of kinetic energy of wind depending upon the below equality:

$$\eta_L = \eta_{td} + \eta_{kin} = 2Cp/V_B^2(T_1-T_2)+(1-C_2^2/V_B^2),$$

where $\eta_L$ is an overall factor of utilization of wind energy;
$\eta_{td}$—is the thermodynamic component of the factor of utilization of wind kinetic energy;
$\eta_{kin}$—is the kinetic component of the factor of utilization of wind kinetic energy;
$Cp=1004.85$ (J/kg K)—isobar heat capacity of air;
$T_1$ an $T_2$—correspondingly, the thermodynamic temperature before and beyond of the blade lattice in K (Kelvin), ° K;
$V_B$—the wind velocity, m/sec;
$C_2$—the absolute air velocity beyond the blade lattice, m/sec.

4. A vertical axis rotor-type wind turbine according to claim 1, wherein the blocks of blades are configured so that self-starting of the rotor occurs at a wind velocity of about 2 msec.

5. A vertical axis rotor-type wind turbine according to claim 1, wherein each respective pair of supporting arms of each respective one of the blocks of blades includes two arms that extend from the rotor shaft to the respective one of the blocks of blades at oblique angles with respect to the vertical axis of the wind turbine.

6. A vertical axis rotor-type wind turbine according to claim 5, wherein each of the two arms of each respective pair of supporting arms is fixed to a respective one of the blocks of blades at positions spaced from the upper and lower shroud flanges with respect to a direction parallel to the vertical axis of the wind turbine.

7. A vertical axis rotor-type wind turbine, comprising:
a rotor shaft that extends along a vertical axis of the wind turbine;
a plurality of aerodynamic blocks of blades, each respective block of blades including a plurality of subsonic aerodynamic blades motionlessly fixed to and extending vertically between an upper shroud flange and a lower shroud flange, each of the plurality of blocks of blades being separate and distinct from each other one of the plurality of blocks of blades; and
a plurality of pairs of supporting arms mounted on the rotor shaft and spaced circumferentially at equal angles around the vertical axis of the rotor, wherein each respective one of the blocks of blades are mounted on a respective pair of supporting arms of the plurality of pairs of supporting arms.

8. A vertical axis rotor-type wind turbine according to claim 7, wherein, for each of the plurality of blocks of blades, the plurality of subsonic aerodynamic blades are linearly arrayed in a first direction in a plane that extends substantially perpendicular to the vertical axis of the wind turbine, and each of the plurality of blocks of blades is mounted at a non-zero angle with respect to a line that extends radially from the vertical axis of the wind turbine in the plane that extends substantially perpendicular to the vertical axis.

9. A vertical axis rotor-type wind turbine according to claim 7, wherein each respective pair of supporting arms of each respective one of the blocks of blades includes two arms that extend from the rotor shaft to the respective one of the blocks of blades at oblique angles with respect to the vertical axis of the wind turbine.

10. A vertical axis rotor-type wind turbine according to claim 9, wherein each of the two arms of each respective pair of supporting arms is fixed to a respective one of the blocks of blades at positions spaced from the upper and lower shroud flanges with respect to a direction parallel to the vertical axis of the wind turbine.

11. A vertical axis rotor-type wind turbine according to claim 7, wherein the blocks of blades are configured so that self-starting of the rotor occurs at a wind velocity of about 2 msec.

* * * * *